(12) United States Patent
Borkholder (10) Patent No.: US 10,493,811 B2
(45) Date of Patent: Dec. 3, 2019

(54) AG TORSION SURGE RECEIVER HITCH

(71) Applicant: Carl J. Borkholder, Bremen, IN (US)

(72) Inventor: Carl J. Borkholder, Bremen, IN (US)

( * ) Notice: Subject to any disclaimer, the term of this patent is extended or adjusted under 35 U.S.C. 154(b) by 105 days.

(21) Appl. No.: 15/877,975

(22) Filed: Jan. 23, 2018

(65) Prior Publication Data

US 2019/0225038 A1    Jul. 25, 2019

(51) Int. Cl.
*B60D 1/24* (2006.01)
*B60D 1/50* (2006.01)
*B60D 1/06* (2006.01)

(52) U.S. Cl.
CPC .............. *B60D 1/249* (2013.01); *B60D 1/06* (2013.01); *B60D 1/50* (2013.01)

(58) Field of Classification Search
CPC ............. B60D 1/249; B60D 1/06; B60D 1/50
USPC .................................................. 280/483–486
See application file for complete search history.

(56) References Cited

U.S. PATENT DOCUMENTS

| | | | | |
|---|---|---|---|---|
| 4,147,376 A * | 4/1979 | Slazas | ............ | B62D 49/02 172/678 |
| 4,641,852 A * | 2/1987 | Kerst | ............ | B60D 1/50 280/489 |
| 6,260,873 B1 * | 7/2001 | Bishel | ............ | B60D 1/145 267/138 |
| 6,443,437 B1 * | 9/2002 | Beyene | ............ | B60G 11/22 267/141.1 |
| 6,494,478 B1 * | 12/2002 | MacKarvich | ............ | B60D 1/06 177/136 |
| 9,802,452 B1 * | 10/2017 | McCall | ............ | B60D 1/249 |
| 2003/0178811 A1 * | 9/2003 | Buckner | ............ | B60D 1/50 280/483 |
| 2008/0296868 A1 * | 12/2008 | Bouwkamp | ............ | B60D 1/143 280/439 |
| 2011/0272908 A1 * | 11/2011 | Tempelman | ............ | B60G 7/001 280/124.121 |
| 2019/0031255 A1 * | 1/2019 | Borkholder | ............ | B62D 53/061 |

* cited by examiner

*Primary Examiner* — Tony H Winner
(74) *Attorney, Agent, or Firm* — Botkin & Hall, LLP (57) ABSTRACT

A torsion receiver hitch is provided having a drawbar portion and a ball mount portion. The drawbar portion can affix to a towing vehicle and the ball mount portion can receive and affix a trailer. The drawbar portion is coupled to the ball mount portion with torsion arms that are affixed to torsion bars. The torsion bars are carried in corresponding torsion tubes affixed to the drawbar and ball mount portion. The ball mount portion can move with respect to the drawbar portion between a compression and tension position. The ball mount portion and drawbar portion remain parallel between the compression and tension position. Located between the compression and tension positions is a rest position. The rest position corresponds to no force being applied between the drawbar portion and ball mount portion.

13 Claims, 12 Drawing Sheets

AG TORSION SURGE RECEIVER HITCH

BACKGROUND OF THE INVENTION

This present disclosure relates to devices that are used to connect a trailer to a vehicle, specifically where the device mounts a ball on one end and is mounted to a vehicle-mounted receiver on the other end. Many trailers use a ball-mount connection to be affixed to the towing vehicle, with the ball being firmly mounted to a drawbar that is attached to the vehicle. There is frequently a small amount of mechanical slop (or lash) between the hitch components along with inertia from the trailer. When the vehicle brakes, the momentum of the trailer, coupled with any mechanical slop creates a surge or mechanical bump from behind and into the vehicle. This can even occur when the trailer is equipped with trailer brakes. This is undesirable and can lead to unstable behavior of the towing vehicle and trailer. An improved device is needed.

SUMMARY OF THE INVENTION

The present disclosure describes a torsion surge receiver hitch with a drawbar portion adapted to be affixed to a towing vehicle, the drawbar portion having a drawbar formed from side plates affixed to a top plate and a bottom plate. The drawbar portion has a first and second torsion tube carrying a corresponding first and second torsion bar. Each torsion bar has a corresponding central axis with the first and second torsion tubes affixed to the side plates of the drawbar portion. The first torsion bar resisting rotation with respect to the first torsion tube and the second torsion bar resisting rotation with respect to the second torsion tube. The central axes of the first and said second torsion bars are parallel.

The torsion surge receiver hitch has a ball mount portion with a third and fourth torsion tube carrying corresponding third and fourth torsion bars. Each torsion bar has a corresponding central axis with the third and fourth torsion tubes affixed to the ball mount portion. The third torsion bar resisting rotation with respect to the third torsion tube and the fourth torsion bar resisting rotation with respect to the fourth torsion tube. The central axes of the third and said fourth torsion bars are parallel.

The hitch has a front torsion arm is affixed to the first and third torsion bars and a rear torsion arm is affixed to the second and fourth torsion bars. The front and rear torsion arms connect the drawbar portion to the ball mount portion. The torsion bars are rotatable between a resting position and a loaded position with the torsion arms being biased toward the resting position. The upper and lower torsion arms remain parallel between the loaded and resting position.

BRIEF DESCRIPTION OF THE DRAWINGS

A preferred embodiment of this invention has been chosen wherein.

DESCRIPTION OF THE PREFERRED EMBODIMENT

A torsion surge receiver hitch 10 is shown in FIGS. 1-13. The hitch 10 is designed to fit a common vehicle-mounted receiver (not shown). The hitch 10 has a drawbar portion 12 and a ball mount portion 14. The vehicle-mounted receiver is typically a square aperture with a transverse hole that receives a pin (not shown) to affix the drawbar portion 12 of the hitch 10 to the towing vehicle. Transverse holes 16, 18 receive the pin to attach the drawbar portion 12 along its drawbar axis 19 to the vehicle. The ball mount portion 14 has an aperture 20 that can receive a standard hitch ball (not shown). Hitch balls are well-known in the art. For clarity, hitch balls have a spherical end and a threaded shaft that extends downwardly. The threaded shaft is placed through the aperture 20, and a nut and lock washer are used to affix the hitch ball to the receiver hitch 10. If affixed, the hitch ball is affixed aligned with axis 21. Static and dynamic forces are transferred to the hitch 10 through the ball mount portion 14.

Figure 1:
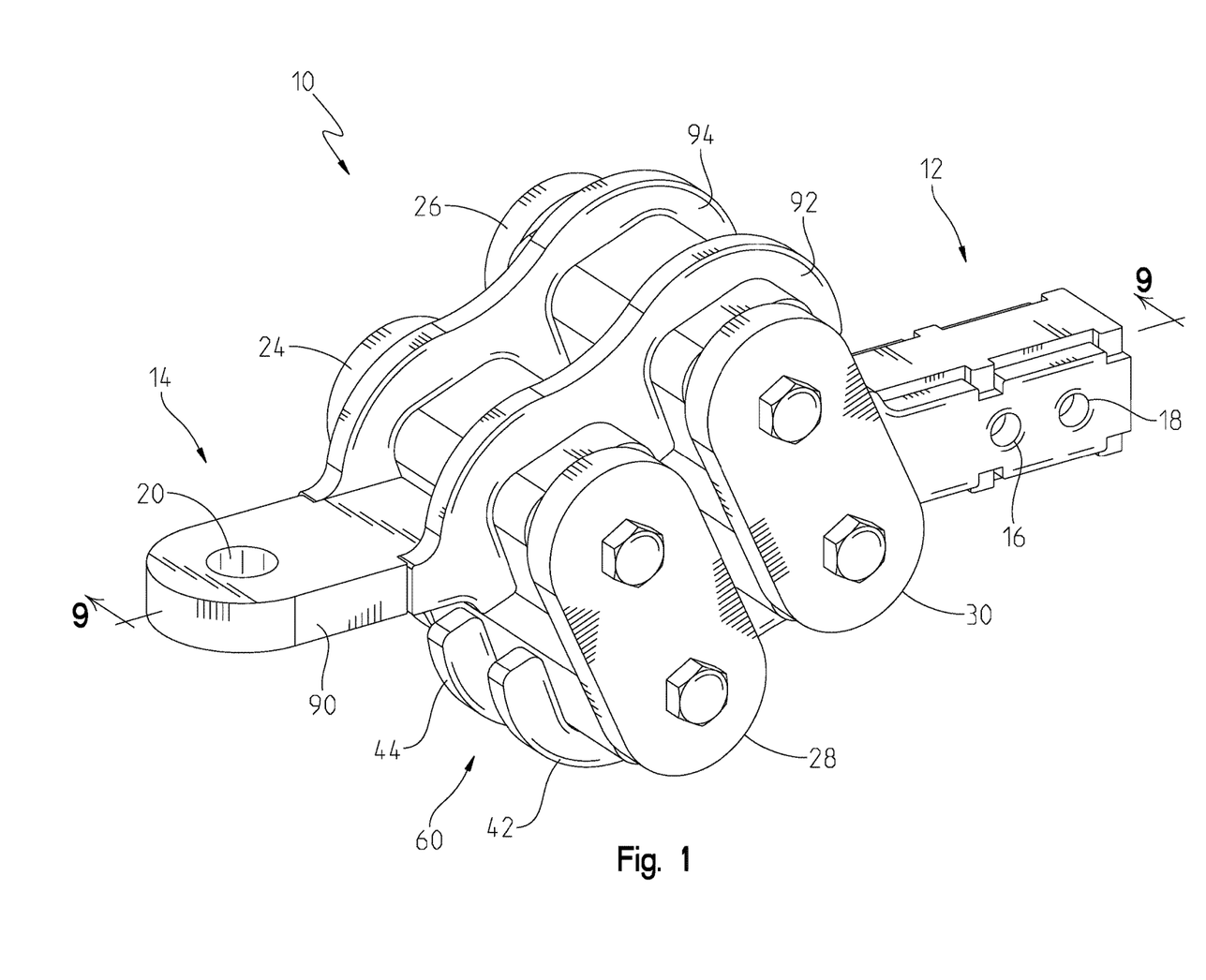
FIG. 1 is a top right side isometric view of the receiver.
Figure 2:
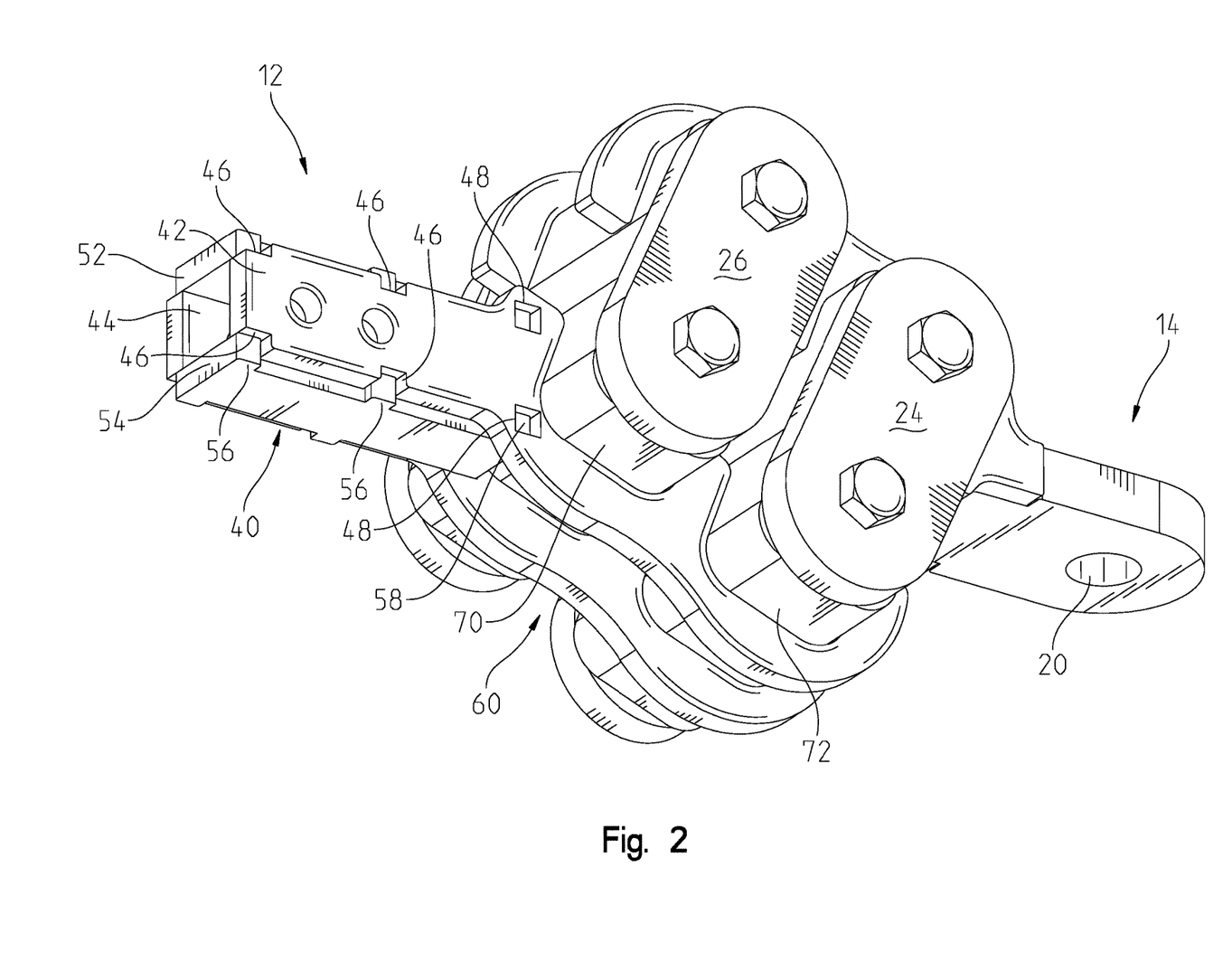
FIG. 2 is a bottom left side isometric view of the receiver.
Figure 3:
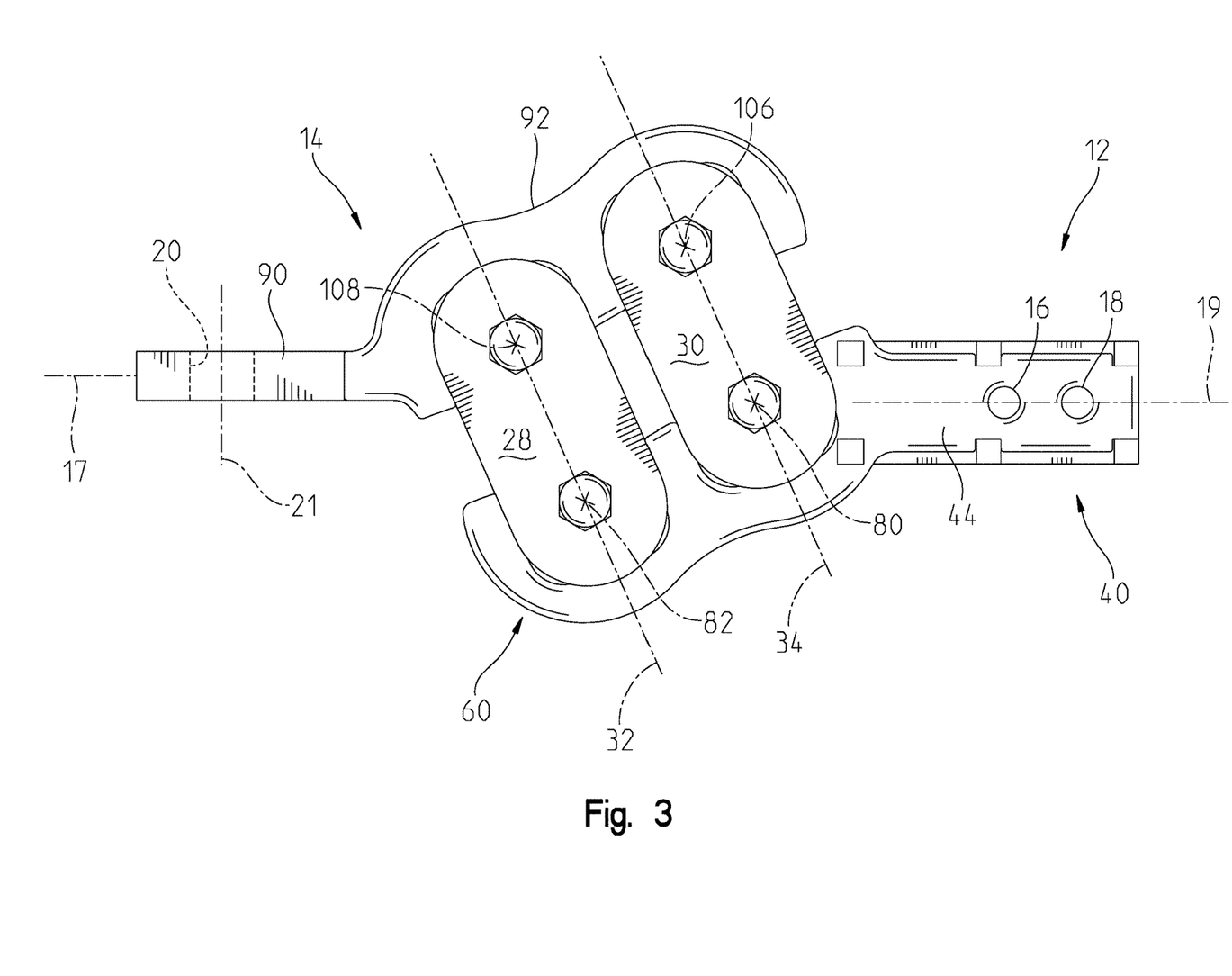
FIG. 3 is a right side view of the receiver.
Figure 4:
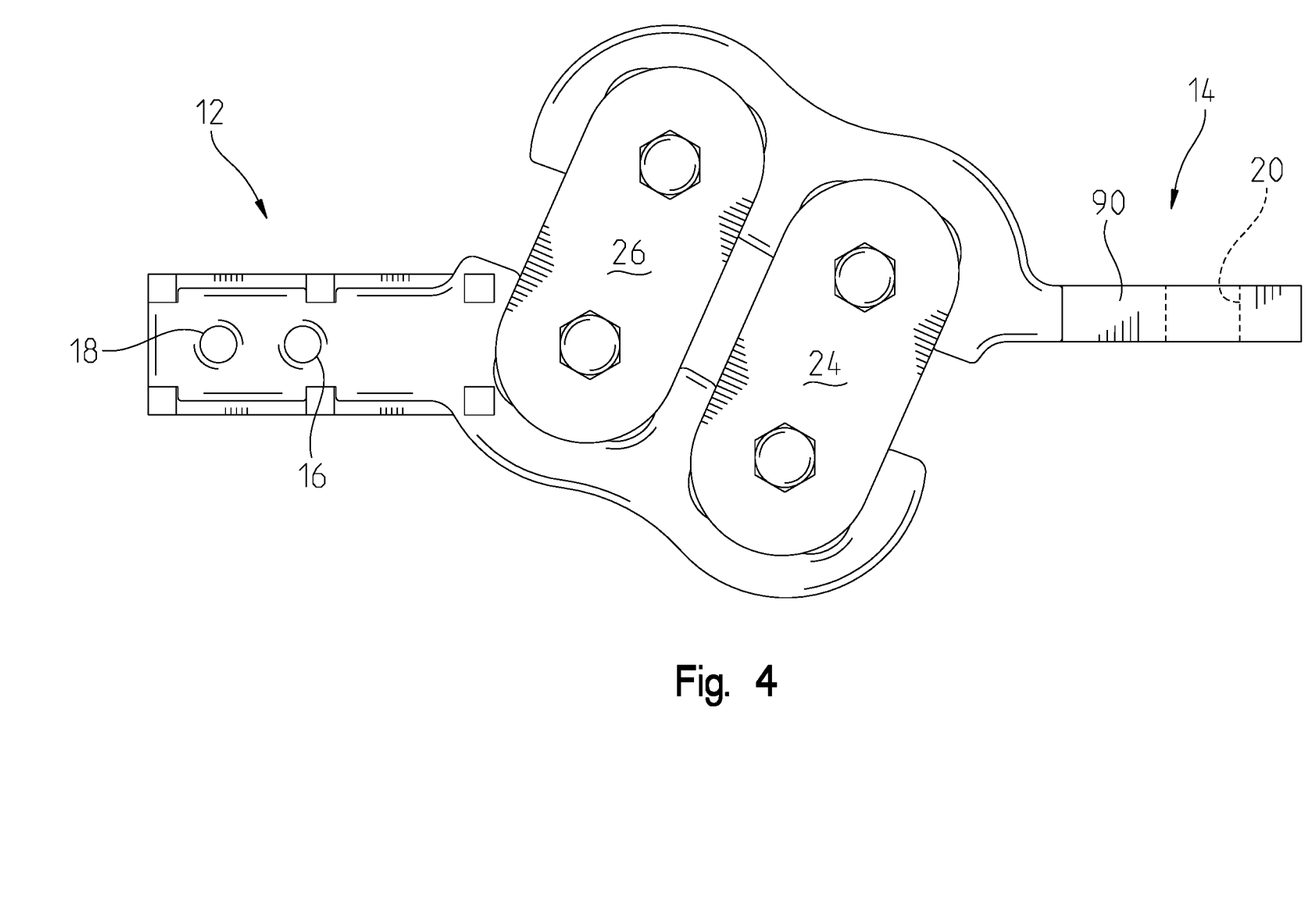
FIG. 4 is a left side view of the receiver.
Figure 5:
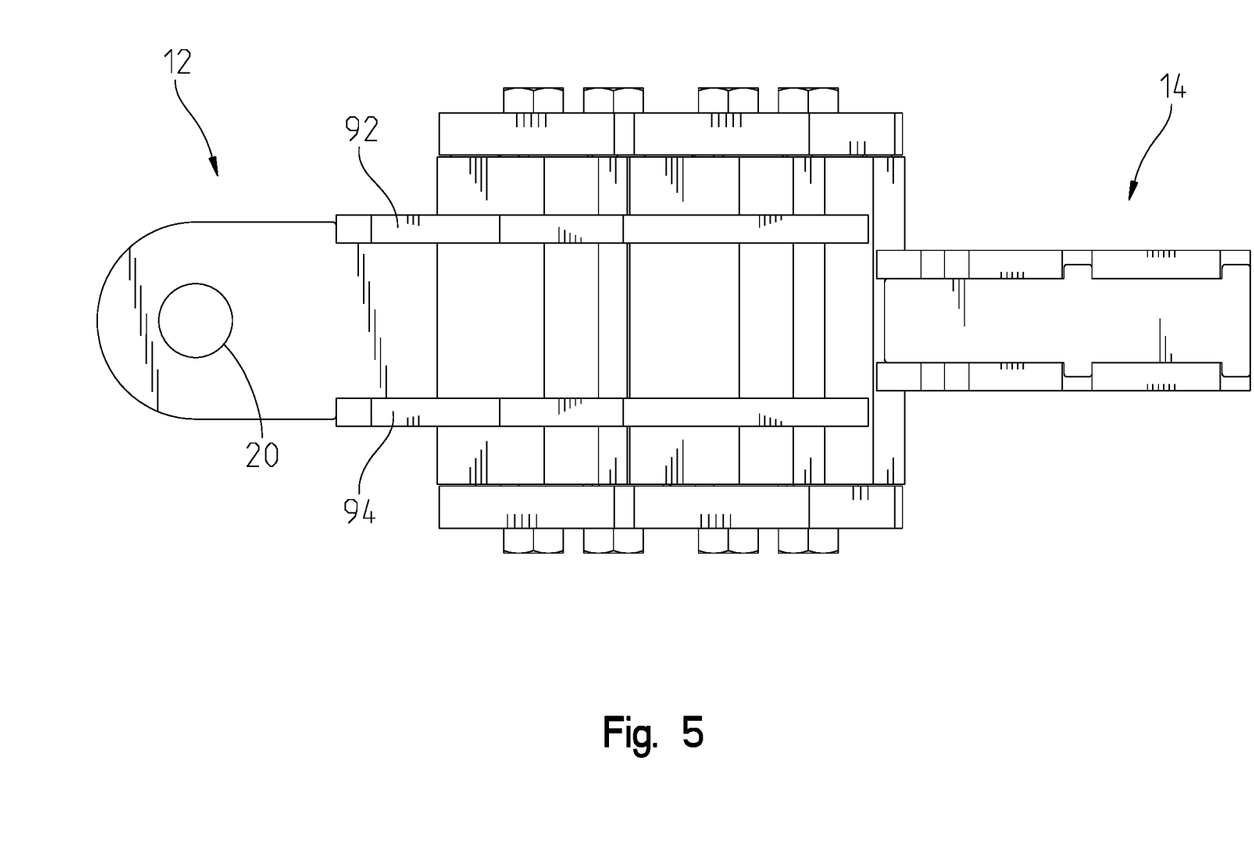
FIG. 5 is a top view of the receiver.
Figure 6:
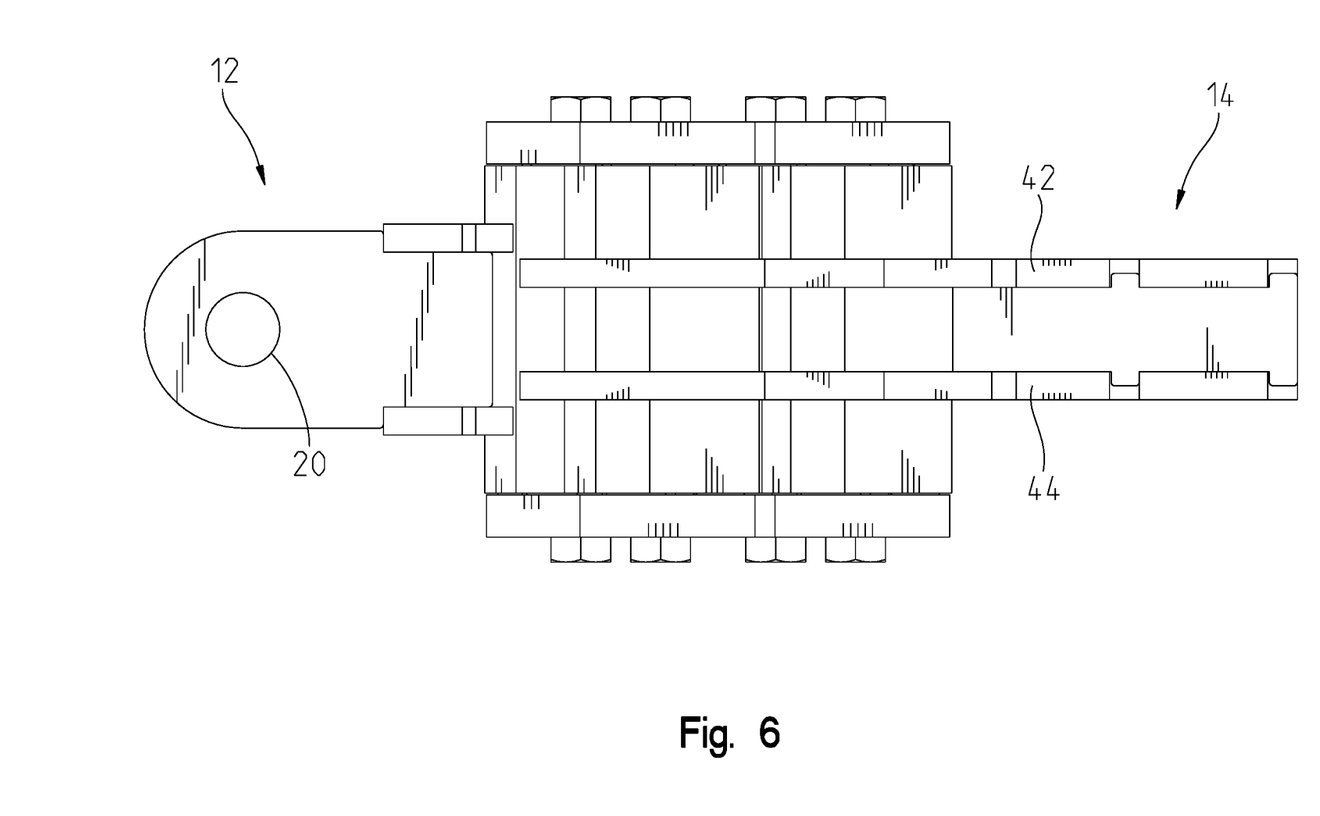
FIG. 6 is a bottom view of the receiver.
Figure 7:
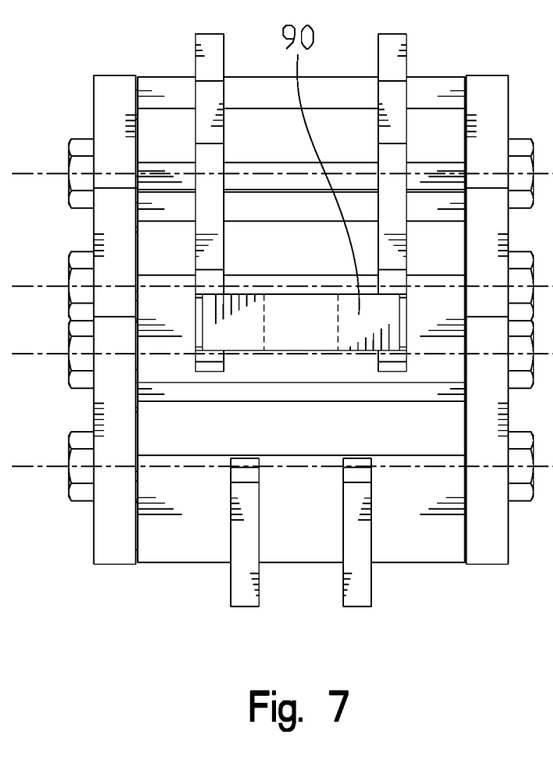
FIG. 7 is a front view of the receiver.
Figure 8:
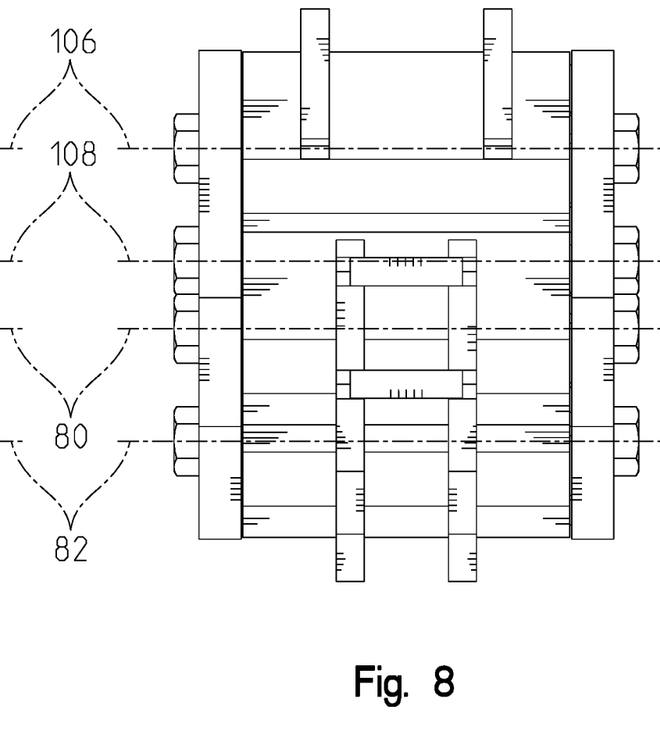
FIG. 8 is a back view of the receiver.
Figure 9:
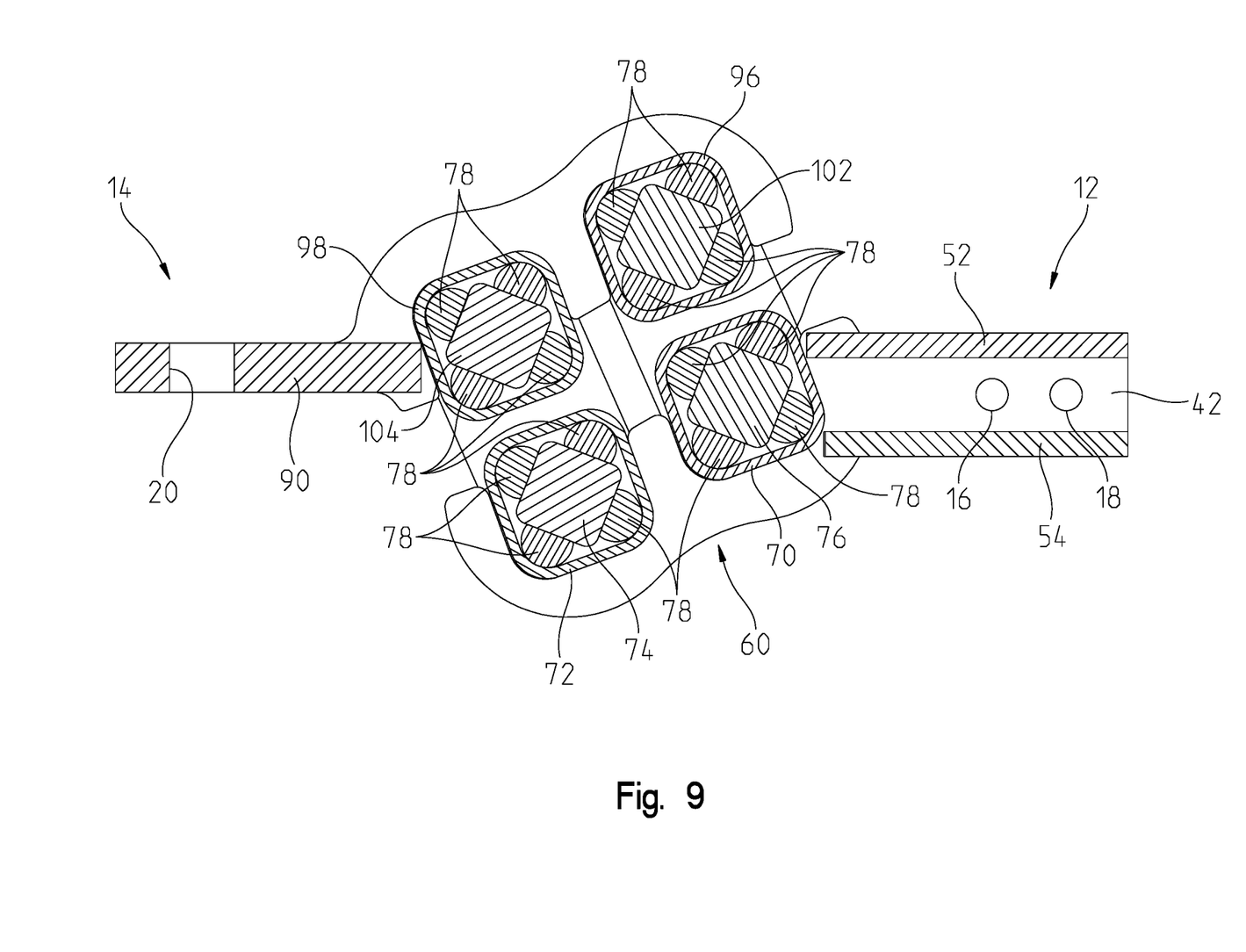
FIG. 9 is a section view 9-9 of the receiver shown in FIG. 1.
Figure 10:
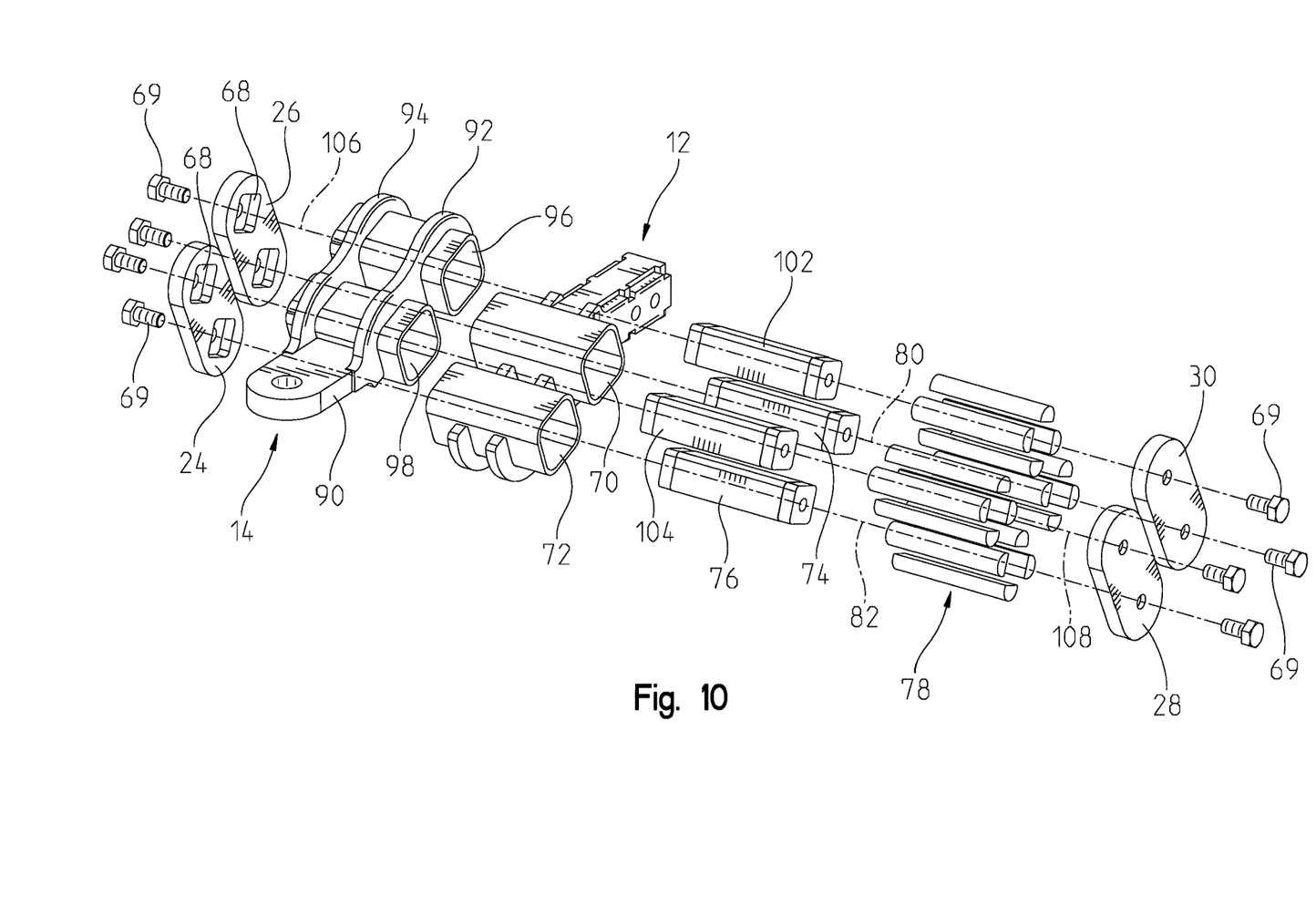
FIG. 10 is an exploded isometric view of the receiver.
Figure 11:
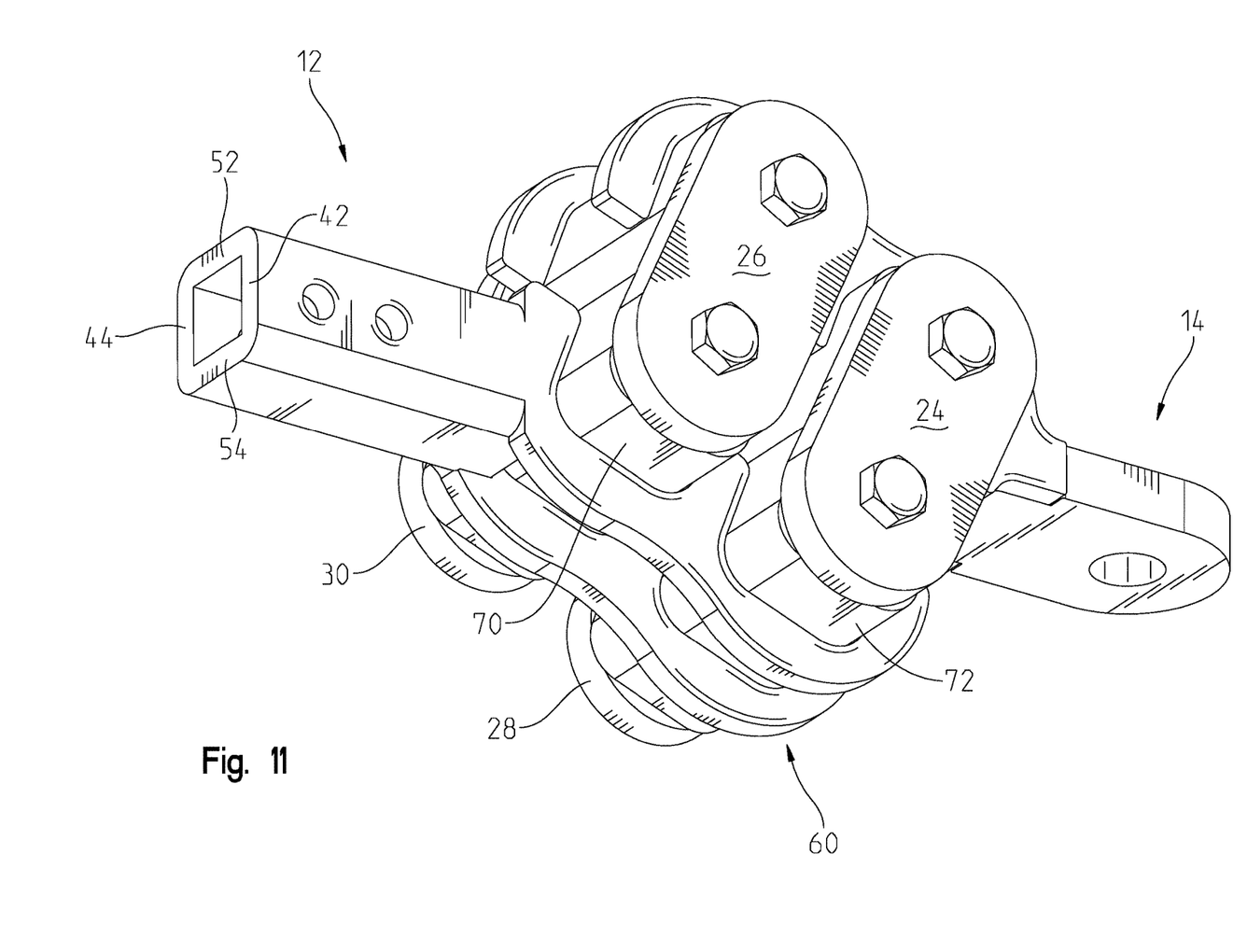
FIG. 11 is an isometric view of the receiver in FIG. 2 showing the plates in a welded state.
Figure 12:
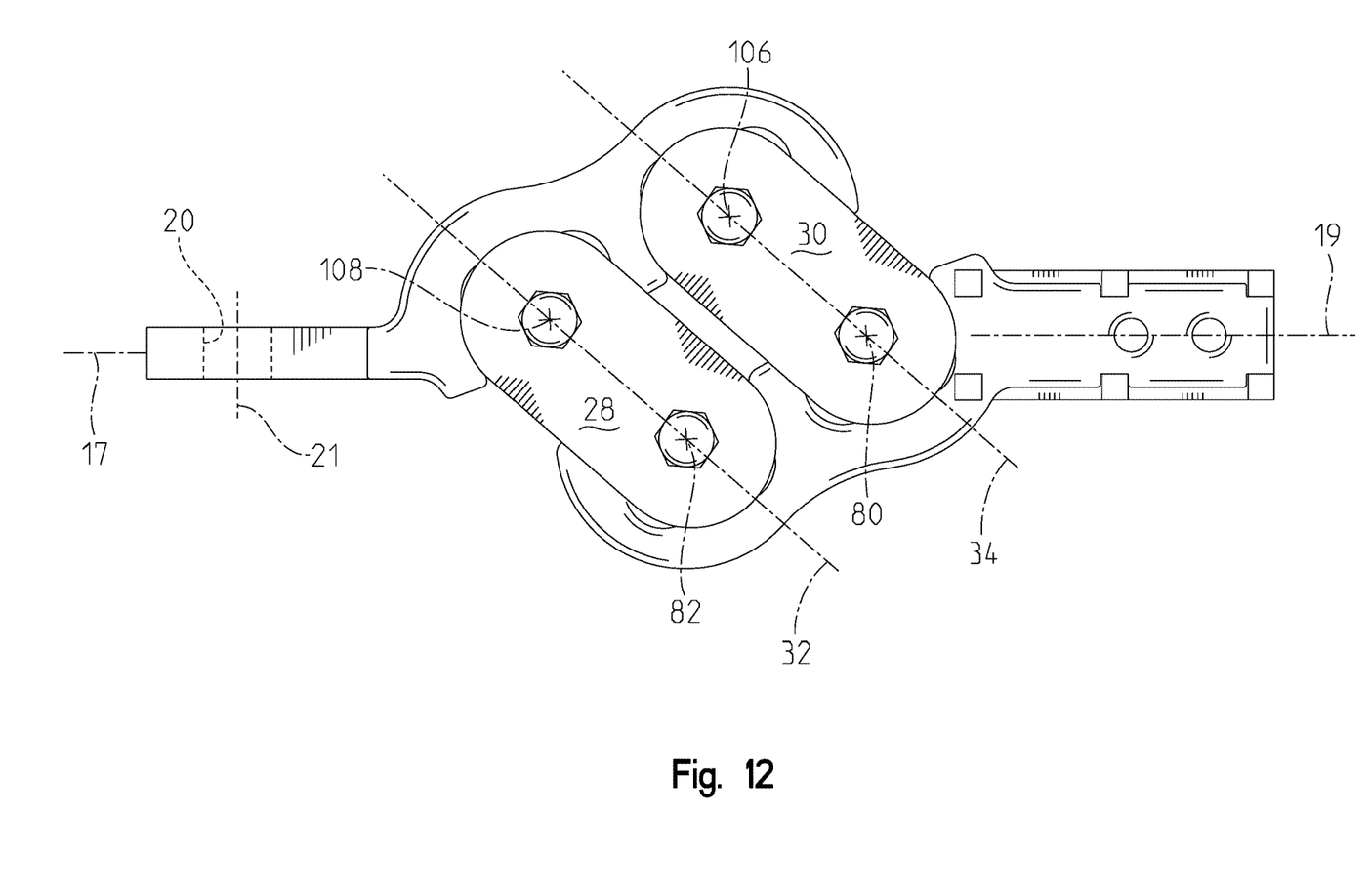
FIG. 12 is a side view of the receiver in FIG. 3 in the tension position.
Figure 13:
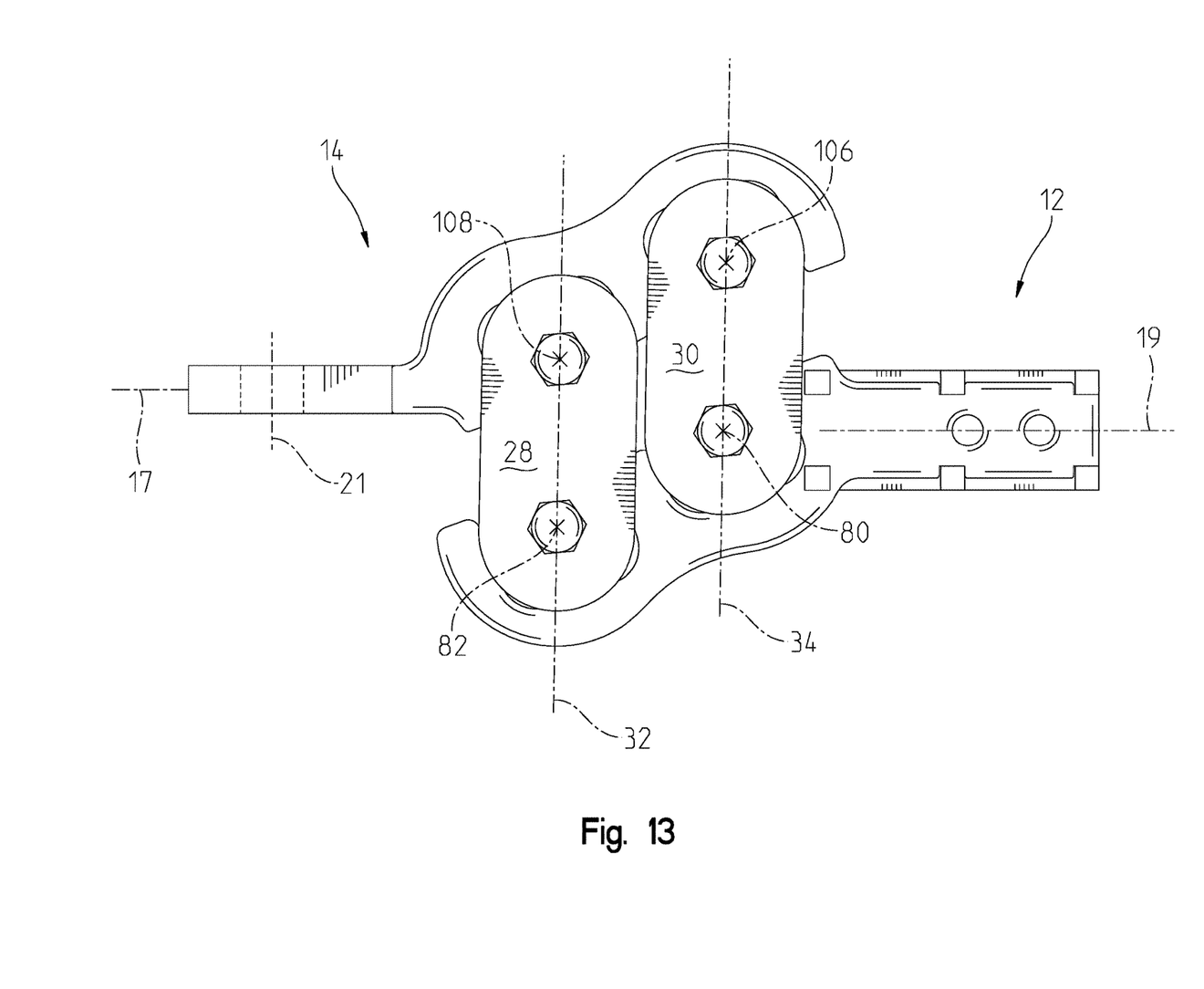
FIG. 13 is a side view of the receiver in FIG. 3 in the compression position.

As shown in FIG. 3, the drawbar portion 12 is connected to the ball mount portion 14 through a series of torsion arms 24, 26, 28, 30. The hitch 10 is shown in FIGS. 1-11 in the resting position. Because of the orientation of the torsion arms 24, 26, 28, 30, the hitch 10 is capable of absorbing and moving in tension and compression along the ball mount axis 17 and draw bar axis 19. Axes 17, 19 are horizontal or mostly horizontal when the drawbar portion 12 is affixed to the towing vehicle. Vertical forces, such as tongue weight of the trailer are primarily aligned with axis 21. Tension is shown in FIG. 12 and compression is shown in FIG. 13. The hitch 10 can also absorb vertical forces on axis 21. In the compression position, shown in FIG. 13, the ball mount axis 17 is at a higher elevation than drawbar axis 19. As the hitch 10 moves to the resting position, shown in FIG. 3, the ball mount axis 17 moves closer to drawbar axis 19. In the tension position, shown in FIG. 12, the ball mount axis 17 is at a lower elevation than drawbar axis 19. At some point between the tension position and compression position, the axes 17, 19 may become aligned. The location of axes 17, 19 are shown through the center of the drawbar portion 12 and ball mount portion 14, but it is contemplated that the axes 17, 19 are located at alternate elevations.

As is shown in FIG. 2, the drawbar portion 12 has a drawbar end 40 made up of four plates. The side plates 42, 44 have notches 46 and apertures 48 that receive complimentary tabs 56, 58 that are on a top plate 52 and bottom plate 54. The notches 46, apertures 48, and tabs 56, 58 align the plates 42, 44, 52, 54 for welding. In order to show the tab and notch features, the plates 42, 44, 52, and 54 are shown in most FIGS. as they appear before welding. An example hitch 10 with the plates 42, 44, 52, 54 welded is shown in FIG. 11. The side plates 42, 44 have a torsion portion 60 where a first torsion tube 70 and a second torsion tube 72 are affixed. The torsion tubes 70, 72 are affixed to the torsion portion 60 through pressing, welding, fusing, brazing, or with other permanent method or material that mechanically affixes the torsion tubes 70, 72 to the side plates 42, 44. The top plate 52 and bottom plate 54 may be affixed to the first torsion tube 70 to provide additional strength.

The torsion tubes 70, 72 carry a corresponding torsion bar 74, 76. Terminal ends of the torsion bars 74, 76 extend beyond the ends of their corresponding torsion tube 70, 72. Resilient cords 78 surround the torsion bars 74, 76. The resilient cords 78 are shown in the exploded diagram of FIG. 10 and section view FIG. 9. When the torsion bars 74, 76 are located their respective torsion tubes 70, 72 and surrounded by the resilient cords 78, the torsion bars resist rotation with respect to the torsion tubes. The torsion bars 74, 76 have a corresponding central axis 80, 82. As shown in FIG. 10, the torsion bars 74, 76 are longer than the corresponding tubes that they reside in, so as assembled, the ends stick out on either side. The torsion arms 24, 26, 28, 30 have corresponding pockets 68 that receive the ends of the torsion bars. A bolt 69 extends through an aperture in the torsion arm and affixes the torsion arm to the corresponding torsion bar by threading into a threaded hole in the end of its respective torsion bar. Torque and other forces between the torsion bars 74, 76 and torsion arms 24, 26, 28, 30 are carried by the bolts and the interfaces between the pockets and the ends of the torsion bars 74, 76.

The ball mount portion 14 is made up of plates 90, 92, and 94. A ball mount plate 90 has the aperture 20 for receiving the ball. Side plates 92, 94 are affixed to the ball mount plate 90 and torsion tubes 96, 98. The torsion tubes 96, 98, much like torsion tubes 70, 72, carry a corresponding torsion bar 102, 104. Terminal ends of the torsion bars 102, 104 extend beyond the ends of their corresponding torsion tube 96, 98. Resilient cords 78 surround the torsion bars 102, 104. The resilient cords 78 are shown in the exploded diagram of FIG. 10 and section view FIG. 9. When the torsion bars 102, 104 are located in their respective torsion tubes 96, 98 and surrounded by the resilient cords 78, the torsion bars 102, 104 resist rotation with respect to their corresponding torsion tube on a central axis 106, 108.

It is contemplated that the ball mount portion 14 either raises or lowers the aperture 20 to allow a higher or lower ball mount. This may be accomplished by changing the shape of ball mount plate 90 to have an upward or downward curve.

A torsion arm axis 32 is shown in FIGS. 3, 12, and 13 that connects central axes 108 and 82. A corresponding torsion arm axis 34 connects central axes 106 and 80. The axes 80, 82, 106, 108 are shown in FIG. 11 and are represented as points in FIGS. 3, 12, and 13 because they extend perpendicularly through the image. As shown in the FIGS, the axes 32 and 34 remain parallel as the device moves from the tension position in FIG. 12, through the resting position in FIG. 3 and to the compression position in FIG. 13.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A torsion surge receiver hitch, said receiver hitch comprising:
   a drawbar portion adapted to be affixed to a towing vehicle, said drawbar portion having a drawbar formed from side plates affixed to a top plate and a bottom plate, said drawbar portion having a first and second torsion tube carrying a corresponding first and second torsion bar, each said torsion bar having a corresponding central axis, said first torsion tube affixed to said side plates of said drawbar portion, said second torsion tube affixed to said side plates of said drawbar portion, said first torsion bar resisting rotation with respect to said first torsion tube, said second torsion bar resisting rotation with respect to said second torsion tube, said central axes of said first and said second torsion bars are parallel;
   a ball mount portion having a third and fourth torsion tube carrying corresponding third and fourth torsion bars, each said torsion bar having a corresponding central axis, said third torsion tube affixed to said ball mount portion, said fourth torsion tube affixed to said ball mount portion, said third torsion bar resisting rotation with respect to said third torsion tube, said fourth torsion bar resisting rotation with respect to said fourth torsion tube, said central axes of said third and said fourth torsion bars are parallel;
   a first torsion arm affixed to said first torsion bar and said third torsion bar, a second torsion arm affixed to said second torsion bar and said fourth torsion bar, said first and second torsion arms connecting said drawbar portion to said ball mount portion; and
   said first and second torsion arms rotatable between a resting position and a loaded position, said torsion arms being biased toward said resting position, said first and second torsion arms remaining parallel between said loaded and said resting position.

2. The torsion surge receiver hitch of claim 1, wherein said ball mount portion is movable with respect to said drawbar portion between a compressed position and a tension position, said torsion bars urging said ball mount portion towards a resting position located between said compression and said tension positions.

3. The torsion surge receiver hitch of claim 2, wherein said ball mount portion has a ball mount axis, said drawbar portion has a drawbar axis, said ball mount axis being parallel to said drawbar axis.

4. The torsion surge receiver hitch of claim 3, said ball mount axis is coaxial to said drawbar axis at a point between said compressed position and said tension position.

5. The torsion surge receiver hitch of claim 1, wherein said first and second torsion arms have pockets adapted to receive terminal ends of corresponding said torsion bars.

6. The torsion surge receiver hitch of claim 1, wherein said first torsion arm has a first torsion arm axis, said first torsion arm axis intersecting said central axis of said first torsion bar and said third torsion bar, said second torsion arm has a second torsion arm axis, said second torsion arm axis intersecting said central axis of said second torsion bar and said fourth torsion bar.

7. A torsion surge receiver hitch, said receiver hitch comprising:
   a drawbar portion adapted to be affixed to a towing vehicle, said drawbar portion having a drawbar, said drawbar portion having a first and second torsion tube affixed thereto and each carrying a corresponding first and second torsion bar, each said torsion bar having a corresponding central axis, said first torsion bar resisting rotation with respect to said first torsion tube, said second torsion bar resisting rotation with respect to said second torsion tube, said central axes of said first and said second torsion bars are parallel;
   a ball mount portion having a third and fourth torsion tube carrying corresponding third and fourth torsion bars, each said torsion bar having a corresponding central axis, said third torsion tube affixed to said ball mount portion, said fourth torsion tube affixed to said ball mount portion, said third torsion bar resisting rotation with respect to said third torsion tube, said fourth torsion bar resisting rotation with respect to said fourth torsion tube, said central axes of said third and said fourth torsion bars are parallel; and a first torsion arm affixed to said first torsion bar and said third torsion bar, a second torsion arm affixed to said second torsion bar and said fourth torsion bar, said first and second torsion arms connecting said drawbar portion to said ball mount portion.

8. The torsion surge receiver hitch of claim 7, wherein said ball mount portion is movable with respect to said drawbar portion between a compressed position and a tension position, said torsion bars urging said ball mount portion towards a resting position located between said compression and said tension positions.

9. The torsion surge receiver hitch of claim 8, wherein said ball mount portion has a ball mount axis, said drawbar portion has a drawbar axis, said ball mount axis being parallel to said drawbar axis.

10. The torsion surge receiver hitch of claim 9, said ball mount axis is coaxial to said drawbar axis at a point between said compressed position and said tension position.

11. The torsion surge receiver hitch of claim 7, wherein said first and second torsion arms have pockets adapted to receive terminal ends of corresponding said torsion bars.

12. The torsion surge receiver hitch of claim 7, wherein said first torsion arm has a first torsion arm axis, said first torsion arm axis intersecting said central axis of said first torsion bar and said third torsion bar, said second torsion arm has a second torsion arm axis, said second torsion arm axis intersecting said central axis of said second torsion bar and said fourth torsion bar.

13. The torsion surge receiver hitch of claim 7, wherein said ball mount portion has a ball mount plate affixed to side plates, said ball mount plate affixed to said fourth torsion tube.

* * * * *